Dec. 15, 1936.    C. E. LAUER ET AL    2,064,549
PROCESS OF TREATING AN ACID-OIL SLUDGE
Filed Sept. 15, 1932
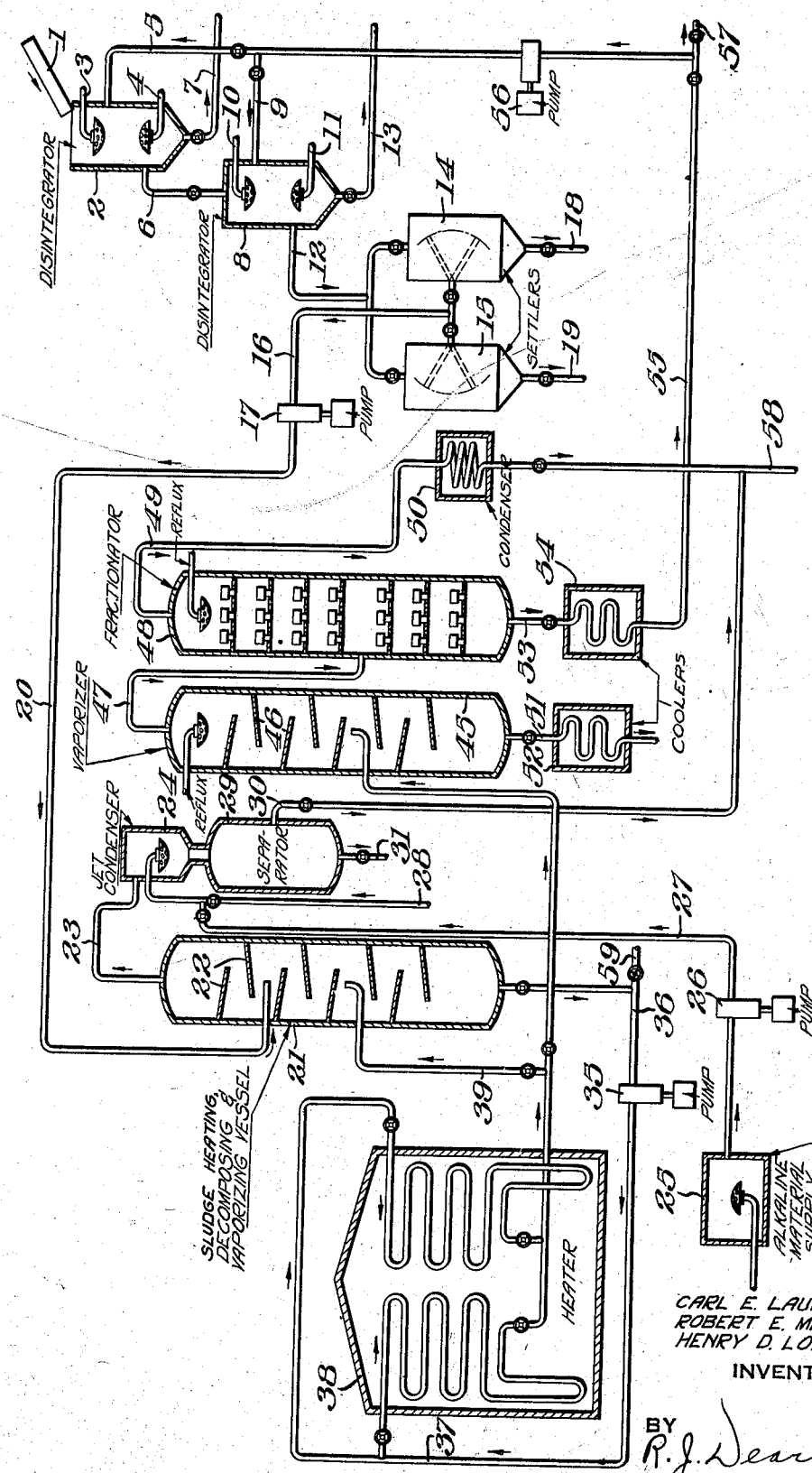
CARL E. LAUER
ROBERT E. MANLEY
HENRY D. LOEB
INVENTORS
BY R. J. Dearborn.
THEIR ATTORNEY Patented Dec. 15, 1936

2,064,549

UNITED STATES PATENT OFFICE 2,064,549

PROCESS OF TREATING AN ACID-OIL SLUDGE

Carl E. Lauer, Port Arthur, Tex., Robert E. Manley, Beacon, and Henry D. Loeb, New York, N. Y., assignors to The Texas Company, New York, N. Y., a corporation of Delaware Application September 15, 1932, Serial No. 633,228

18 Claims. (Cl. 196—148)

The present invention relates to a fuel oil and its preparation, and particularly to the production of a merchantable fuel oil from acid-oil sludge derived from the treatment of mineral oil with sulphuric acid.

The invention primarily contemplates a method of preparing fuel oil from acid-oil sludge, resulting from the sulphuric acid treatment of mineral lubricating and light oils, that is ordinarily considered a by-product of little commercial value, which consists essentially in separating out the oil-soluble portion of the sludge and subjecting it to a purifying treatment, in accordance with the invention, to develop a relatively heavy fuel oil base of satisfactory merchantable grade.

Normally the acid-oil sludge resulting from the sulphuric acid treatment of mineral oils consists of a portion of tarry or pitch-like substance which is insoluble and immiscible in either oil or water, a portion of oily substance which is soluble in a mineral oil diluent, and a portion of dilute sulphuric acid, and includes a relatively small amount of sulphonic acids and complex sulphur compounds.

In the past, it has been customary to dilute a batch of sludge with a light oil, such as gas oil, and water and preferably to agitate and heat the mass with steam to disintegrate the sludge and dilute the acid content, and then separate out the dilute acid and withdraw it for recovery in any of the several well known methods of acid recovery. Following this step, the remaining sludge, still usually containing a small amount of recoverable sulphuric acid, may be further washed with water, diluted with light oil if necessary, and agitated with steam, the dilute acid withdrawn and the sludge washed with an aqueous alkali, such as caustic soda, to neutralize the small amount of sulphuric acid and compounds remaining as far as possible.

In the case of sludges from the treatment of light oils, it will be obvious to those skilled in the art that the above described separation may be simplified. As well known in the art, the oil-soluble portion of the light oil sludges may be separated from the main part of the unconsumed acid by washing with water and without the use of any diluent oil. The acidic oil thus derived may then be treated in accordance with our invention.

A fuel oil produced by such treatment however, is not merchantable as it may contain the previously mentioned tarry portion, largely in an unstable state of suspension perhaps, and a quantity of water-soluble salts resulting from the neutralization. A fuel oil base material of this nature will not only be unstable and not homogeneous, because of the presence of the tarry substance, but will also be harmful to burners and furnaces. When the fuel is burned, encasing crusts may be formed on the furnace parts or corrosive vapors are formed which are detrimental to the furnace.

The present invention consists broadly of diluting and disintegrating the sludge, and separating out the dilute acid for recovery, in one or more steps, and then the unneutralized sludge is subjected to settling to separate out and remove substantially all of the insoluble tarry portion and water; the remaining dilute oil-soluble sludge is heat-treated to decompose and remove the objectionable acidic sulphur compounds in a novel manner, and the diluent oil is distilled and recovered for further use in diluting sludge.

The dilute sludge that remains from the separation of the tarry portion will still contain some sulphonic acids, a small amount of dilute sulphuric acid perhaps, and other acidic sulphur compounds resulting from the acid treatment of the oil and a small additional amount of less harmful more refractory sulphur compounds perhaps, which existed naturally in the oil treated. The acidic compounds particularly are either harmful to the pipe lines, tanks, burners, furnace parts, etc., which they may be brought in contact with, in the state in which they exist in the light sludge, or will become so as they are heated to a point of decomposition. We have found that conversion of these acidic sulphur compounds which are present in the dilute sludge is substantially complete at about 400° F. Accordingly, in an initial limited heating step, we effect their decomposition and remove the resulting vapors from the system as they are produced. The vapors resulting from this decomposition are not particularly corrosive at the preferred temperature of decomposition, but they do become corrosive as the temperature is lowered to the point of steam condensation. Accordingly, it is preferable to remove them from the system as fast as they are formed.

Since substantially complete decomposition and vaporization of these acidic sulphur compounds may be accomplished at about 400° F., it is preferable to employ a diluent for the sludge which boils above that temperature so as not to remove a substantial amount of it from the sludge during the heating step.

The remaining dilute oil-sludge, which is substantially free from acidic compounds, is then subjected to fractional distillation. From this fractional distillation step, a stable uniform fuel oil material of merchantable grade is derived as a residue, while the diluent oil is recovered as a distillate. In this step there is also some decomposition of the sulphur compounds existing naturally in the oil, caused by the rather high temperature required to effect distillation of the diluent oil. The residue may be sold as a merchantable fuel, or fuel oil base material.

The various advantages of the invention will be better understood by referring to the following description and the accompanying drawing which shows in sectional elevation, a preferred embodiment of an apparatus suitable for the operation of the process.

In the operation of the process, acid-oil sludge derived from the treatment of a mineral oil with sulphuric acid may be conducted through a chute 1, from a source not shown, into a disintegrating or separating tank 2, which has a water connection 3, a steam connection 4, and a diluent oil connection 5. When a sufficient amount of the sludge has been delivered into the tank 2, diluent oil and water may be delivered into the tank for the purpose of thinning the sludge, by diluting the oil-soluble portion and the acid portion present, to effect a separation of the acid, oily portion and tarry portion. Following the addition of the diluent oil and water, steam is sprayed into the lower portion of the tank and a vigorous agitation and warming of the mass of sludge and diluents is carried on until a fairly thorough disintegration of the mass is effected and then it is settled. In this step, three layers will ordinarily be formed, which consist of weak acid, the tarry oil-insoluble portion, and the dilute oil-soluble portion. The upper layers of dilute oily portion and tarry portion may then be drawn off into a second tank 8, through a line 6, and the weak acid may be drawn off to a recovery system through a line 7.

The tank 8 has a diluent oil connection 9, a water connection 10, and a steam connection 11. In this tank a repetition of the disintegrating and settling of the sludege is effected and the resulting oil-soluble portion and tarry portion may be drawn off into settling tanks 14 or 15 while the dilute acid may be withdrawn to a recovery system through a line 13.

The oil-soluble and the oil-insoluble portions of the sludge are preferably delivered alternately into settling tanks 14 and 15, in which a thorough separation of the two portions is effected. By employing two settlers, it is possible to carry on separation in one of the settlers while the other is being drained and refilled, thus making available a continuous supply of sludge for the process. The oil-soluble portion is preferably withdrawn from one of the settlers at a time through a line 16 by a pump 17, and the tarry portion may be drained off through a line 18 or a line 19.

As previously mentioned the oil-soluble portion withdrawn by a pump 17 may contain slight amounts of sulphuric acid, sulphonic acids, and other acidic sulphur compounds. This portion is preferably delivered through a line 20 to the upper portion of a vessel 21 which contains a series of baffles 22. As it moves downwardly through the vessel over the baffles 22, it is brought into contact with a heat-carrying medium, to be hereinafter described, by which it is rapidly heated to a temperature at which the water content vaporizes and the acidic sulphur compounds are decomposed to yield less complex volatile compounds. This vaporization and decomposition readily takes place under the temperatures existing in the vessel which may vary somewhat from the bottom to top over a range of about 380° to 420° F. at about atmospheric pressure.

In the novel manner of this invention, the heating of the acid-oil sludge to a point of decomposition and volatilization of the acidic sulphur compounds is effected with ease and economy, with the result that the life of the equipment is greatly prolonged and the corrosive effect of the decomposition products is substantially avoided.

The heat-carrying medium, which consists of a circulated portion of the previously purified oil portion, is injected into the vessel 21 at a point somewhat lower than the entrance of the untreated oil sludge, preferably at a temperature of about 750° F. The heat imparted by the hot oil effects the desired decomposition of the corrosive sulphur compounds, converting them into vaporous form. The oil which has been vaporized is cooled and condensed, falling to the bottom of the vessel 21, together with the oil content of the sludge, which has now been substantially freed from corrosive compounds.

The vapors developed in the vessel 21 by the heat interchange between the acid-oil sludge and the hot purified oil-sludge are delivered overhead through a line 23, while the unvaporized oil portion, which has been freed of water and acidic sulphur compounds, is accumulated in the lower portion of the tower 21. The pressure in the vessel 21 is preferably maintained at about 15 to 20 pounds per square inch gauge, but it is obvious that pressures below or above this may be used if desired.

The vapors, which may also include a small proportion of light oil such as naphtha vapor, are ejected from the vessel 21 by a jet condenser 24 by which they are brought into contact with a neutralizing alkaline material which is supplied from a tank 25 by a pump 26 through a line 27, together with cooling water which may be supplied through a line 28. The water and naphtha from the jet condenser 24 are dropped into a separator 29 which is provided with an oil outlet line 30 and a water drain line 31. Preferably milk of lime is employed as the alkaline material and in such quantity that a substantially neutral solution results. However, other alkaline materials, such as caustic soda, soda ash and waste alkali solutions, may also be used.

A pump 35 withdraws purified dilute oil-sludge from the lower portion of the vessel 21 through a line 36 and delivers it through a line 37 into a suitable heater 38 where the temperature is raised to about 750° or 775° F. A portion of the heated material is returned to the vessel 21 through a line 39 to effect the heat treatment of the sludge oil which is delivered into the vessel through the line 20, as previously described. It is to be understood that this portion of oil, which is returned to the vessel 21, is merely for accomplishing the heat treatment of the sludge oil, and for this purpose a recirculation of an adequate portion of the purified sludge is carried on continuously.

The remaining portion of the heated oil is delivered into a vaporizing vessel 45 which contains a series of baffles 46. In the vessel 45, the diluent oil which as previously mentioned may be of the nature of gas oil, is substantially vaporized leaving a residue constituting a purified fuel oil or fuel oil base material. Although the characteristics of this residue depend upon the origin of the sludge which has been processed, in any case it is a homogeneous material which is soluble in and completely miscible with other liquid petroleum products. Thus a good merchantable fuel oil material is produced by the present invention, whereas the material produced by the prior art method contained objectionable materials, such as suspended oil-insoluble material and salts, and in many instances an excess of diluent material of low flash point which rendered it unfit for sale. The fuel oil produced by this invention, therefore, has the desirable property of having an exceedingly low ash content, for example, the fuel ordinarily produced may have an ash content of about .1 per cent and fuel has been produced in commercial operation by this method having below .01 per cent.

The vapors evolved in the vessel 45 consist preponderantly of the vapors of the diluent gas oil, and may include a small amount of lighter hydrocarbons, which may be of the nature of naphtha, together with small portions of heavier constituents and uncondensable gas produced in the heating step. By applying reflux cooling to the upper portion of the vessel, it is possible to cleanse the vapors of the heavier constituents, which may be entrained thereby, so that the vapors may emerge free of this heavy substance. Any cooling medium may be used as a reflux, although it is preferable to use a gas oil of the nature of that vaporized in the vessel 45.

The cleansed vapor is conducted overhead from the vessel 45 through a line 47 to a fractionator 48 in which the gas oil fraction is condensed, and the naphtha and lighter vapors are withdrawn overhead through a line 49 to a condenser 50. It may also be desirable to apply reflux cooling to the upper portion of the fractionator 48 to cleanse the vapors before they are removed from the fractionator, in which case it may be preferable to return a portion of the naphtha condensed in the condenser 50.

The remaining unvaporized material in the vessel 45, which is the purified fuel oil or base material, is withdrawn through a line 51 through a cooler 52 to storage or elsewhere. The condensate from the vessel 48, which is the recovered diluent oil, is withdrawn through a line 53, through a cooler 54, and is preferably returned through a line 55, to the disintegrators 2 and 8 by a pump 56. A connecting line 57 is provided for withdrawing excess portions of the diluent oil, or for augmenting the supply of diluent in the system, as required. The light condensate, which is condensed from the vapors from the fractionator 48 in a condenser 50, may be combined with the light oil condensed in the jet condenser 24 and discharged from the system through a line 58. A drain line connection 59 is also provided from the line 36 for draining the vessel 21 or removing a quantity of the purified dilute sludge from the system at any time.

The line 58 which serves as a discharge line for the light condensate also serves as a discharge line for any gases which remain as uncondensables after passing through the jet condenser 24 and the coil condenser 50. As the gases which may be produced in the operation may have some fuel value or may be poisonous it may be desirable to separate them from the condensate and deliver them directly to the furnace to be burned.

Obviously many modifications and variations of the invention, as hereinbefore set forth, may be made without departing from the spirit and scope thereof, and therefore only such limitations should be imposed as are indicated in the appended claims.

We claim:

1. In a process of treating an acid-oil sludge containing objectionable acidic sulphur compounds, the steps that comprise preliminarily treating the sludge to remove weak acid and carbonaceous material substantially insoluble in light petroleum oil, heating the treated sludge to approximately 400° F. thereby decomposing and volatilizing the acidic sulphur compounds, and separating the volatilized products of decomposition from the oil sludge to produce a merchantable fuel oil.

2. The process of treating an acid-oil sludge containing objectionable acidic sulphur compounds which comprises delivering the sludge into a heating chamber, passing a hot oil into the chamber in direct contact with the sludge to heat the same to about 380° F. to 420° F. and thereby effecting decomposition and vaporization of the acidic sulphur compounds, withdrawing the resulting vapors, and recovering a purified oil sludge of merchantable fuel oil grade from the residual product in the chamber.

3. The process of treating an acid-oil sludge containing objectionable acidic sulphur compounds and a light oil diluent which comprises delivering the sludge into a heating chamber, passing a hot oil into the chamber in direct contact with the sludge to heat the same to about 380° F. to 420° F. thereby effecting decomposition and vaporization of the acidic sulphur compounds, withdrawing the resulting vapors, collecting the purified oil sludge containing diluent light oil, heating a portion of it to a substantially higher temperature and introducing it into the chamber as the said hot oil to effect heating and decomposition of the acidic sulphur compounds therein.

4. The process of treating an acid-oil sludge containing objectionable acidic sulphur compounds which decompose at a temperature of the order of 400° F. and a light oil diluent boiling primarily above this temperature which comprises delivering the sludge into a heating chamber, passing a hot oil into the chamber in direct contact with the sludge to heat the same and effect decomposition and vaporization of the acidic sulphur compounds without substantial vaporization of the light oil diluent, withdrawing the resulting vapors, collecting the purified oil sludge containing diluent light oil, and then separating the diluent oil by fractional distillation leaving the purified oil sludge as a residual product of merchantable fuel oil grade.

5. The process of treating an acid-oil sludge containing objectionable acidic sulphur compounds which decompose at a temperature of the order of 400° F. and a light oil diluent boiling primarily above this temperature which comprises delivering the sludge into a heating chamber, passing a hot oil into the chamber in direct contact with the sludge to heat the same and effect decomposition and vaporization of the acidic sulphur compounds without substantial vaporization of the light oil diluent, withdrawing the resulting vapors and effecting condensation and neutralization thereof by treating them with an aqueous alkaline material, collecting the purified oil sludge containing diluent light oil, and then separating the diluent oil by fractional distillation, leaving the purified oil sludge as a residual product of merchantable fuel oil grade.

6. The process of treating an acid-oil sludge containing objectionable acidic sulphur compounds and a light oil diluent which comprises delivering the sludge into a heating chamber, passing a hot oil into the chamber in direct contact with the sludge to heat the same and effect decomposition and vaporization of the acidic sulphur compounds, withdrawing the resulting vapors and effecting condensation and neutralization thereof by treating them with an aqueous alkaline material, collecting the purified oil sludge containing diluent light oil, withdrawing the mixture and heating it to a substantially higher temperature, introducing a portion of it into the chamber as the said hot oil to effect heating therein, passing the remainder into a fractionating column and separating it into diluent light oil vapors and purified oil sludge of merchantable fuel oil grade as a residual product.

7. The process of treating an acid-oil sludge derived from the treatment of a hydrocarbon oil with sulphuric acid and containing objectionable acidic sulphur compounds which decompose at a temperature of the order of 400° F. which comprises adding water and a diluent light oil to the sludge, heating and agitating the mixture with steam, separating the mixture by settling into a dilute sulphuric acid, an oil-insoluble heavy sludge and an oil-soluble sludge containing the diluent light oil, heating the oil-soluble sludge and contained diluent light oil to a temperature controlled to decompose and volatize the acidic sulphur compounds, without substantial vaporization of the diluent light oil, separating the decomposition products from the oil sludge and contained diluent oil, and then separating the diluent oil by fractional distillation leaving the purified oil sludge as a residual product of merchantable fuel oil grade.

8. The process of treating an acid-oil sludge derived from the treatment of a hydrocarbon oil with sulphuric acid and containing objectionable acidic sulphur compounds which comprises adding water and a diluent light oil to the sludge, heating and agitating the mixture with steam, separating the mixture by settling into a dilute sulphuric acid an oil-insoluble heavy sludge and an oil-soluble sludge containing the diluent light oil, delivering the oil-soluble sludge into a heating chamber, passing a hot oil into the chamber in direct contact with the sludge to heat the same to about 380° F. to 420° F. thereby effecting decomposition and vaporization of the acidic sulphur compounds, withdrawing the resulting vapors, collecting the purified oil sludge containing diluent light oil, and separating the diluent oil by fractional distillation leaving the purified oil sludge as a residual product of merchantable fuel oil grade, condensing and collecting the diluent light oil and recirculating it to the first step of the process.

9. The process of treating an acid-oil sludge containing objectionable acidic sulphur compounds and a light oil diluent which comprises delivering the sludge into the upper portion of a heating chamber, introducing a hot oil into the lower portion of the chamber with resultant vaporization of at least a portion of the hot oil therein, effecting contact between the hot vapors and down-flowing sludge whereby the latter is heated and the acid compounds are decomposed and vaporized and the hot oil vapors are substantially condensed, withdrawing the resulting vapors from the decomposition of said acid compounds, and recovering a purified oil sludge of merchantable fuel oil grade from the residual product in the chamber by separation of the light oil diluent by fractional distillation.

10. The process of treating an acid-oil sludge containing objectionable acidic sulphur compounds and a light oil diluent which comprises delivering the sludge into the upper portion of a heating chamber, introducing a hot oil into the lower portion of the chamber with resultant vaporization of at least a portion of the hot oil therein, effecting contact between the hot vapors and down-flowing sludge whereby the latter is heated and the acidic compounds are decomposed and vaporized and the hot oil vapors are substantially condensed, withdrawing the resulting vapors, collecting the purified oil sludge containing diluent light oil, withdrawing a portion of the mixture of oil sludge and diluent and heating it to a substantially higher temperature, and introducing it into the lower portion of the chamber as the said hot oil to effect heating therein.

11. The process of treating an acid-oil sludge containing objectionable acidic sulphur compounds and a light oil diluent which comprises delivering the sludge into the upper portion of a heating chamber at a temperature less than that necessary to effect decomposition and vaporization of the acidic sulphur compounds, introducing a hot oil into the lower portion of the chamber with resultant vaporization of at least a portion of the hot oil therein, effecting contact between the hot vapors and down-flowing sludge whereby the latter is heated to a temperature of about 380° F.–420° F. and thereby effecting decomposition and vaporization of the acidic sulphur compounds and substantially condensing the hot oil vapors, withdrawing the resulting vapors, collecting the purified oil sludge containing diluent light oil, withdrawing a portion of the mixture of oil sludge and diluent and heating it to a substantially higher temperature, and introducing it into the lower portion of the chamber as the said hot oil to effect heating therein.

12. The process of treating an acid-oil sludge containing objectionable acidic sulphur compounds and a light oil diluent which comprises delivering the sludge into the upper portion of a heating chamber, simultaneously introducing a hot oil into the chamber, bringing the mixture of oil sludge and diluent into contact with vapors of said hot oil whereby the mixture is raised to a temperature of about 380°–420° F. at which the acidic compounds decompose and vaporize, withdrawing the resulting vapors, and recovering a purified oil sludge of merchantable fuel oil grade from the residual product in the chamber.

13. The process of treating an acid-oil sludge which comprises separating the sludge into an acid portion, a heavy oil-insoluble sludge portion and a lighter oil-soluble sludge portion, removing the lighter oil-soluble sludge portion to a heating chamber, passing a hot oil into the chamber in contact with the sludge to heat the same to effect decomposition and vaporization of acidic sulphur compounds contained therein, separating the resulting vapors from the purified oil sludge, heating a portion of the purified oil sludge to a substantially higher temperature and introducing it into the chamber as the said hot oil, and recovering from the purified oil sludge a merchantable fuel oil.

14. The process of treating an acid-oil sludge which comprises adding water and a mineral oil diluent to the sludge, separating the mixture into a dilute acid portion, a heavy oil-insoluble sludge portion and a lighter oil-soluble sludge portion containing the diluent, removing the lighter oil-soluble sludge portion with contained diluent to a heating chamber, passing a hot oil into the chamber in contact with the sludge and contained diluent to heat the same to effect decomposition and vaporization of acidic sulphur compounds contained therein, withdrawing the resulting vapors from the purified oil sludge containing the diluent, heating a portion of the purified oil sludge with contained diluent to a substantially higher temperature and introducing it into the chamber as the said hot oil, and fractionating the purified oil sludge and contained diluent to recover a merchantable fuel oil therefrom.

15. The process of treating an acid-oil sludge which comprises adding water and a mineral oil diluent to the sludge, separating the mixture into a dilute acid portion, a heavy oil-insoluble sludge portion and a lighter oil-soluble sludge portion containing the diluent, removing the lighter oil soluble sludge portion with contained diluent to a heating chamber, passing a hot oil into the chamber in contact with the sludge and contained diluent to heat the same to effect decomposition and vaporization of acidic sulphur compounds contained therein, withdrawing the resulting vapors from the purified oil sludge containing the diluent, continuously circulating from the heating chamber purified oil sludge with contained diluent in a continuous stream through a heating zone to heat the same to a substantially higher temperature, returning a portion of the circulating stream to the heating chamber as the said hot oil to effect the heating therein, passing another portion of the heated circulating stream to a fractionating zone and fractionating therein to separate the diluent and recover from the purified oil sludge a merchantable fuel oil.

16. The process of treating an acid-oil sludge which comprises delivering the sludge into a heating chamber, passing a hot oil into the chamber in contact with the sludge to heat the same and effect decomposition and vaporization of acidic sulphur compounds contained therein, withdrawing the resulting vapors, continuously circulating from the heating chamber purified oil sludge in a continuous stream through a heating zone to heat the same to a substantially higher temperature, returning a portion of the circulating stream to the heating chamber as the said hot oil to effect the heating therein, passing another portion of the circulating stream to a fractionating zone and fractionating therein to separate from the oil sludge a merchantable fuel oil.

17. The process of treating an acid-oil sludge containing objectionable acidic sulphur compounds which comprises delivering the sludge into a heating chamber and flowing the sludge downwardly therein, passing a hot oil into the chamber in direct contact with the down-flowing sludge to heat the same to about 380° F.–420° F. and thereby effect decomposition and vaporization of the acidic sulphur compounds prior to accumulation of the purified sludge in a pool in the lower portion of the chamber, withdrawing the resulting vapors, circulating a portion of the accumulated pool through the heating zone to heat the same to a substantially higher temperature and reintroducing it into the chamber as the said hot oil, and recovering a purified oil sludge of merchantable fuel oil grade from the accumulated pool in the chamber.

18. The process of treating an acid-oil sludge containing objectionable acidic compounds which decompose at a temperature below substantially 420° F. and a light oil diluent boiling primarily above this temperature, which comprises delivering the sludge into a heating chamber and flowing it downwardly therein, passing a hot oil into the chamber in direct contact with the down flowing sludge to heat the same and effect decomposition and vaporization of the acidic sulphur compounds without substantial distillation of the light oil diluent prior to accumulation of the purified sludge in a pool in the lower portion of the chamber, withdrawing the resulting vapors, removing the purified oil sludge containing diluent light oil from the accumulated pool, and then separating the diluent oil by fractional distillation leaving the purified oil sludge as a residual product of merchantable fuel oil grade.

CARL E. LAUER.
ROBERT E. MANLEY.
HENRY D. LOEB.